United States Patent
Cooley et al.

(10) Patent No.: US 8,024,803 B1
(45) Date of Patent: Sep. 20, 2011

(54) METHODS AND SYSTEMS FOR FILTERING ELECTRONIC MESSAGES

(75) Inventors: Shaun Cooley, El Segundo, CA (US); Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 473 days.

(21) Appl. No.: 12/329,671

(22) Filed: Dec. 8, 2008

(51) Int. Cl.
 *G06F 17/30* (2006.01)
(52) U.S. Cl. .................................. 726/22; 726/27; 726/3
(58) Field of Classification Search .................... 726/22, 726/27, 3
 See application file for complete search history.

(56) References Cited

OTHER PUBLICATIONS

Architecture design for SPX: Secure networking Platform for group-oriented eXchange; Yagi, T.; Kondoh, T.; Kuwahara, T.; Murayama, J.; Ohsaki, H.; Imase, M.; Information and Telecommunication Technologies, 2008. APSITT. 7th Asia-Pacific Symposium on; Publication Year: 2008 , pp. 132-137.*
Anti-Spam Techniques, Wikipedia, printed out year 2011.*
SonicWALL Email Security of the SMB, printed out year 2011.*
Exchange Server 2007 Managing and Filtering Anti-Spam Agent Logs, Exchangepedia, printed out year 2011.*

\* cited by examiner

*Primary Examiner* — David Y Jung
(74) *Attorney, Agent, or Firm* — Advantedge Law Group (57) ABSTRACT

A computer-implemented method for filtering electronic messages. The method may include identifying a first time period during which a user accesses electronic messages less than during a second time period. The method may also include associating a first filtering level with the first time period and associating a second filtering level with a second time period. The method may further include, during the first time period, setting a spam filter to the first filtering level. The first filtering level may cause the spam filter to perform stronger filtering than the second filtering level. The method may include, during the second time period, setting the spam filter to the second filtering level. Corresponding systems and computer-readable media are also disclosed.

20 Claims, 6 Drawing Sheets

METHODS AND SYSTEMS FOR FILTERING ELECTRONIC MESSAGES

BACKGROUND

Spam has been a serious problem for email administrators and users for many years, growing from one in sixteen emails in 2002 to approximately three out of four emails in 2007. In fact, after five years of dealing with spam and throwing significant resources at the problem, over half of messaging decision-makers in mid-sized and large organizations may still view spam as a very serious problem according to a recent survey. Spam has evolved from a minor nuisance that made up a small subset of all internet email to a scourge that may now make up the majority of email sent around the world.

The fundamental challenge in solving the spam problem is that spammers are becoming more sophisticated in their approach to defeating conventional spam-blocking technologies. Savvy spammers continually figure out how to circumvent traditional spam-filtering technologies. As a result, even if a user has a spam filter, the user may spend a significant amount of time sifting through spam each day to find important emails.

Spam may be particularly annoying when the user has been away from their computer for a time. When the user returns to check email on the computer, the user may have to deal with all the spam that arrived during their absence. In addition to causing the user to waste time, spam buildup may make it more likely that the user overlooks an important email. What is needed, therefore, is a more effective approach to dealing with spam.

SUMMARY

Embodiments of the instant disclosure are directed to filtering electronic messages by using different filtering levels during different time periods. For example, embodiments of the instant disclosure may use stronger filtering during the night time—when less important emails may come to a user's inbox—than during the day time.

In one embodiment, a filter-control module may identify a first time period during which a user accesses electronic messages less than during a second time period. For example, the Filter-control module may monitor a user's access to electronic messages (e.g., emails, text messages, etc.) to determine when the user most often accesses messages. A user may sit at their desk during the day time and may access messages throughout the day, but during the night the user may not access messages. In this example, the filter-control module may identify the night time as the first time period (i.e., the time period during which the user accesses electronic messages less) and the day time as the second time period (i.e., the time period during which the user assess electronic message more).

In other embodiments, the filter-control module may receive, an identification of the first time period from the user. For example, the user may indicate that the user wants stronger filtering during a certain time of day than during other times of day. Several different filtering levels can be used for several different times of day.

A database may associate a first filtering level with the first time period and a second filtering level with the second time period. Then, a spam filter may filter electronic messages using the first filtering level during the first time period. During the second time period, the spam filter may filter electronic messages using the second filtering level.

In some embodiments, the filtering levels may be filter weightings. In such embodiments, a first filter weighting may cause the filter to filter more spam than the second filter weighting. The filtering levels may also be any other suitable filtering criteria. For example, the first filtering level may be a white-list mode that tells the spam filter to only allow messages from senders on a white list to be sent to the user's inbox. The white list may be, for example, a list of contacts in a user's electronic address book.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The instant disclosure generally relates to methods and systems for filtering electronic messages, such as emails and text messages. The methods and systems, disclosed herein may use different filtering levels for different times of day depending on a user's electronic-message-access patterns. As a result, embodiments of the present disclosure may provide more robust and effective spam filtering than prior technologies.

Figure 1:
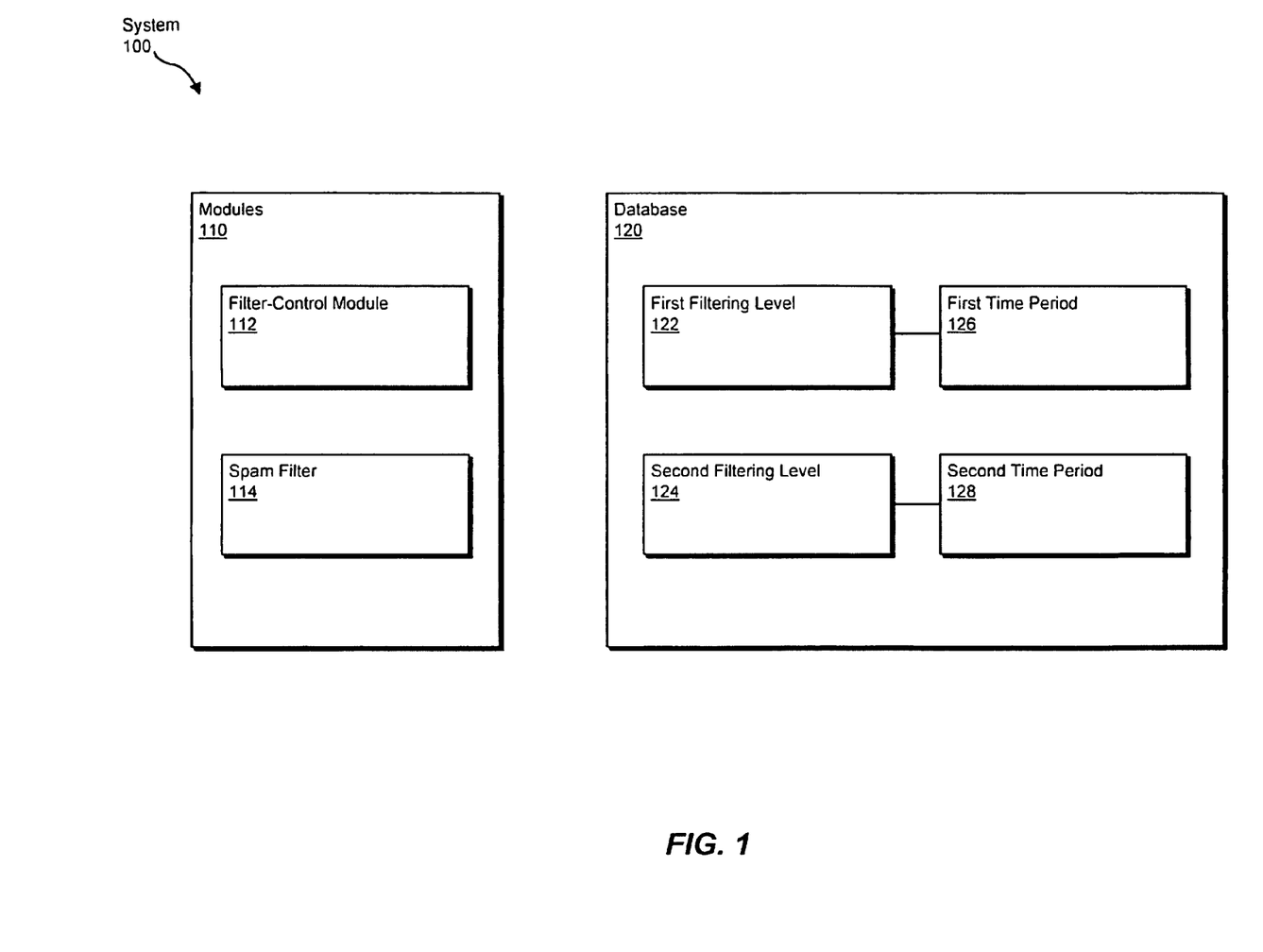
FIG. 1 is a block diagram of an exemplary system for filtering electronic messages according to certain embodiments.
Figure 2:
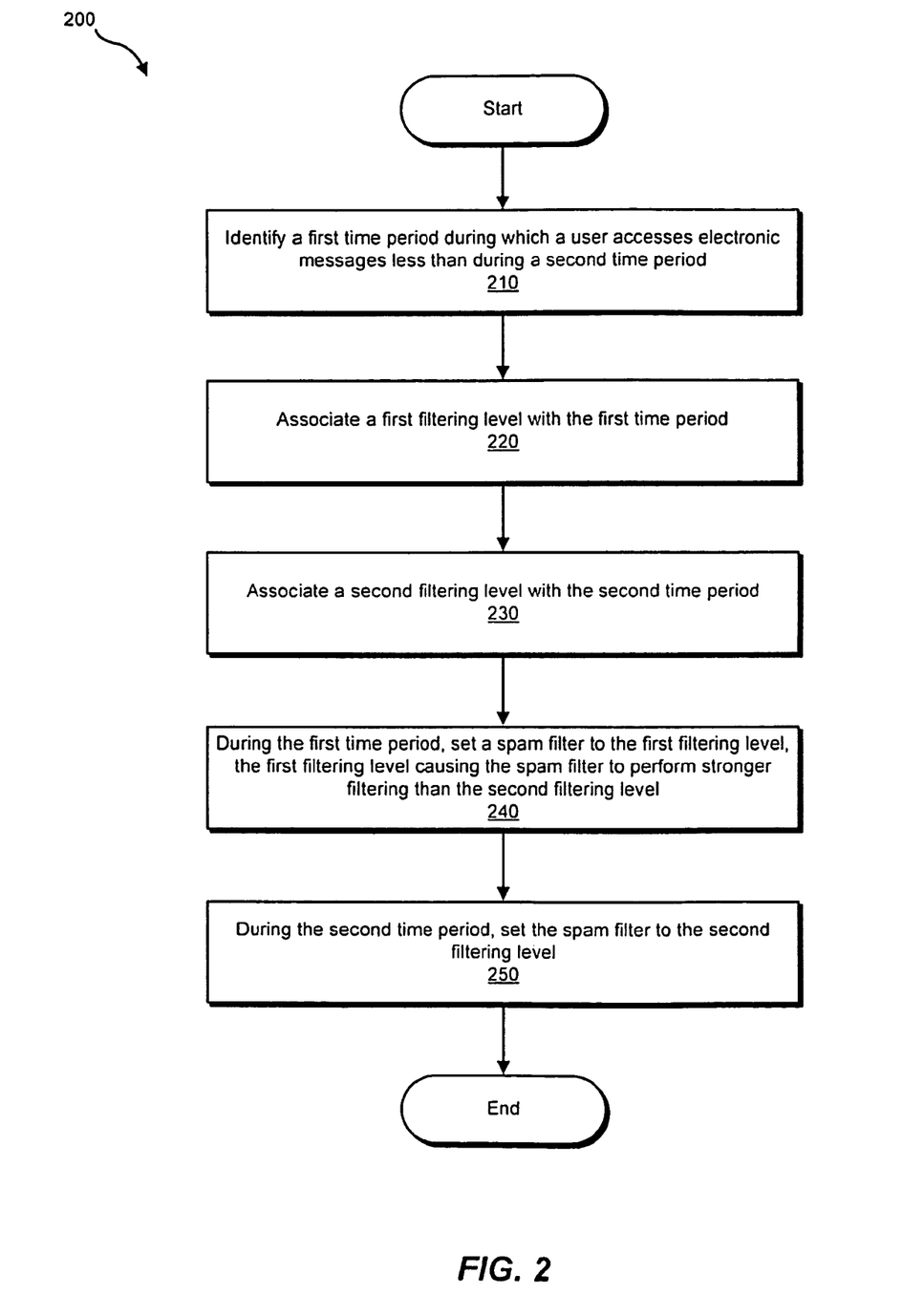
FIG. 2 is a flow diagram of an exemplary method for filtering electronic messages according to certain embodiments.
Figure 3:
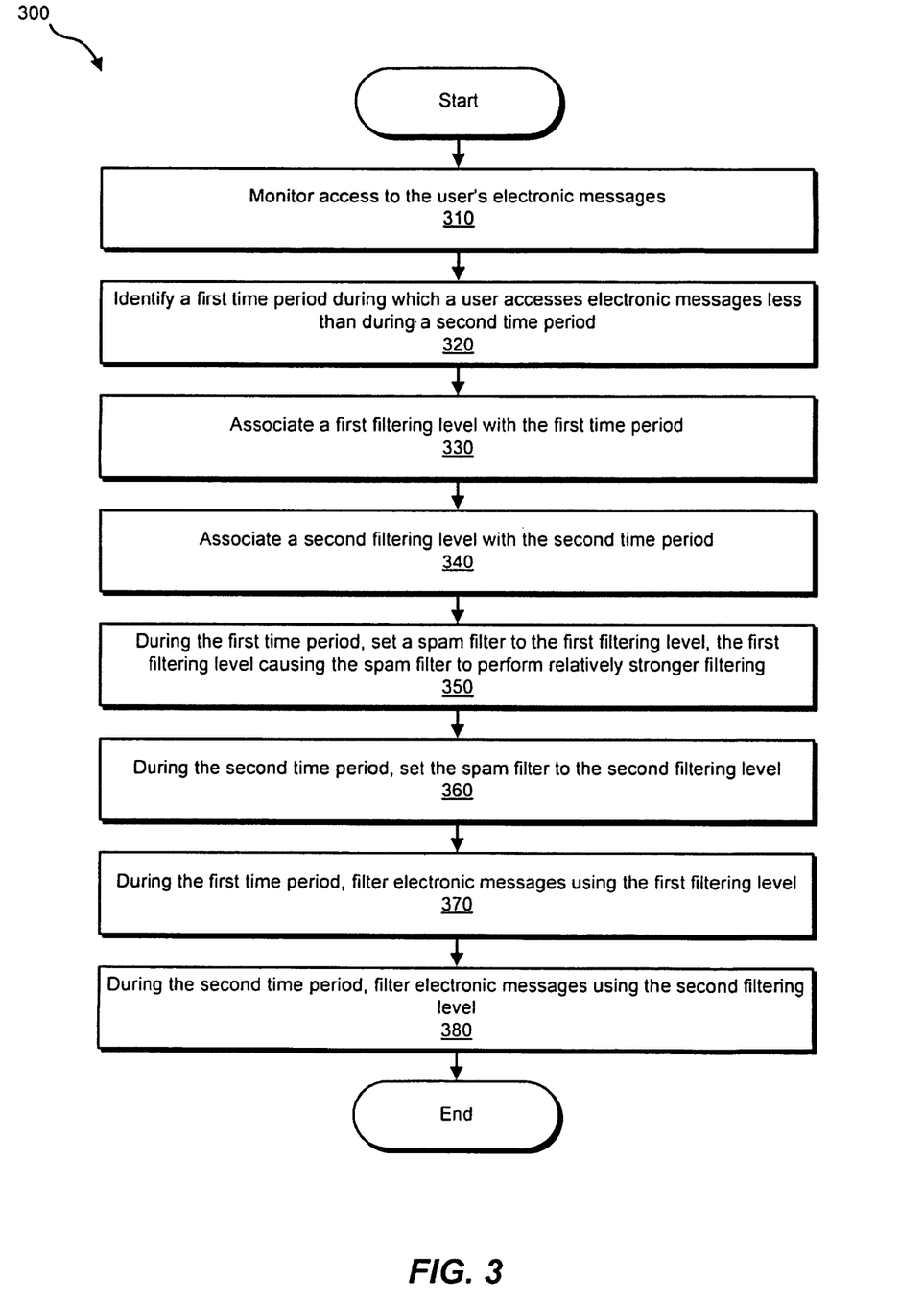
FIG. 3 is a flow diagram of another exemplary method for filtering electronic messages according to certain embodiments.
Figure 4:
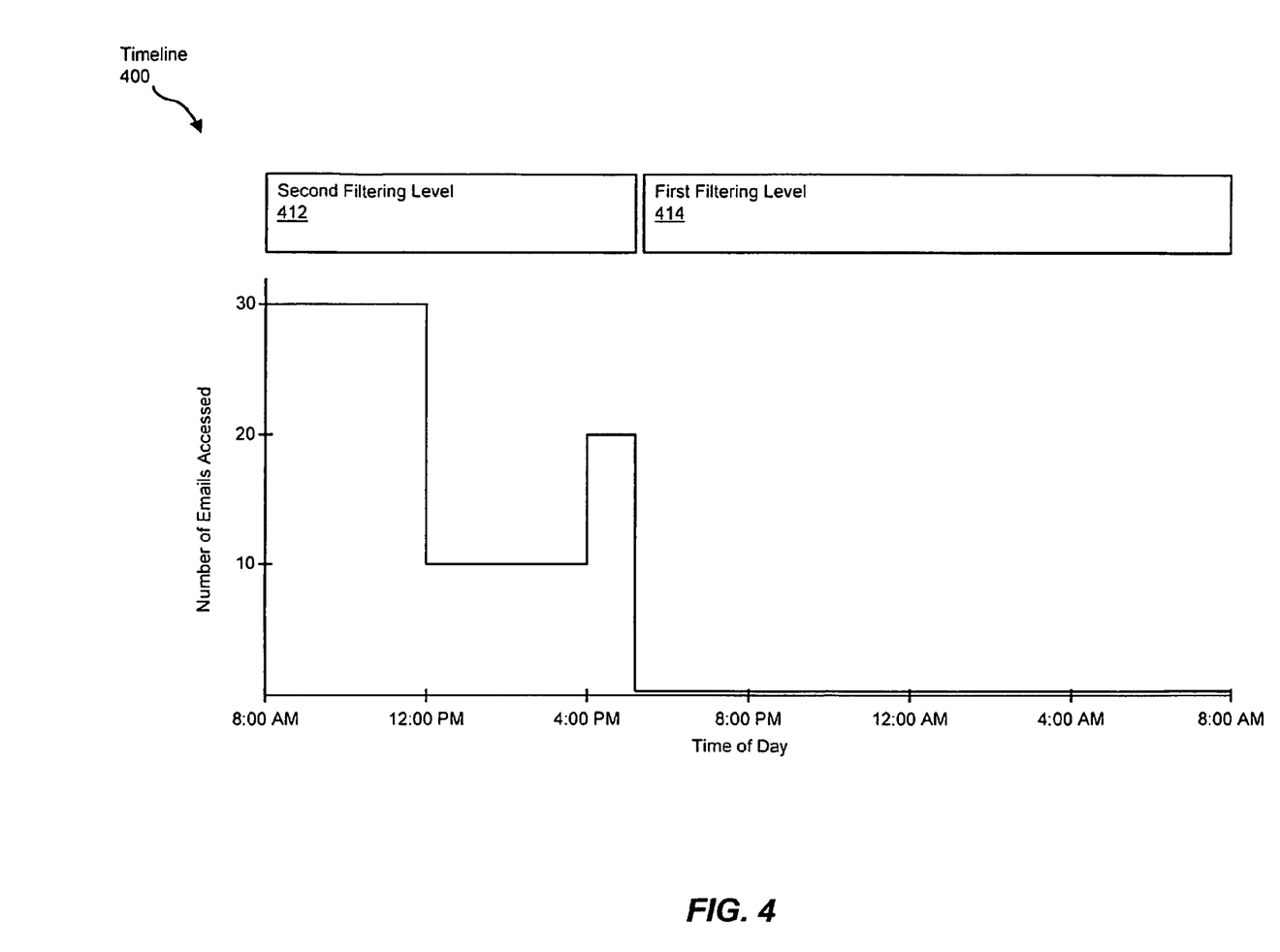
FIG. 4 is a timeline showing different times during a day that different filtering levels may be used according to certain embodiments.

The following will describe, with reference to FIG. 1, an exemplary system for filtering electronic messages. FIGS. 2 and 3 show steps that may be performed in filtering electronic messages, and FIG. 4 shows a time line during which different filtering levels may be applied. Descriptions of an exemplary system and an exemplary network architecture capable of implementing one or more of the embodiments described and/or illustrated herein are provided in connection with FIGS. 5 and 6.

FIG. 1 is a block diagram of an exemplary system 100 for filtering electronic messages. As illustrated in this figure, exemplary system 100 may comprise one or more modules 110. Modules 110 may include a filter-control module 112 and a spam filter 114. Filter-control module 112 may perform one or more of the filter-level control steps performed herein. Filter-control module 112 may also perform various other steps and functions. Spam filter 114 may perform one or more of the filtering steps discussed herein.

In certain embodiments, one or more of modules 110 in FIG. 1 may represent one or more software applications or programs that, when executed by a computing device, may cause the computing device to perform one or more tasks required to filter electronic messages. For example, as will be described in greater detail below, one or more of modules 110 may represent software modules programmed to run on one or more computing devices, such as exemplary computing system 510 in FIG. 5 and/or portions of exemplary network architecture 600 in FIG. 6. One or more of modules 110 in FIG. 1 may also represent all or portions of one or more special-purpose computers.

As detailed above, system 100 may also comprise a database 120. Database 120 may be any suitable data storage mechanism. Database 120 may comprise a local database that stores filtering levels and associated time periods. For example, database 120 may associate a first filtering level 122 with a first time period 126. Database 120 may also associate a second filtering level 124 with a second time period 128. In some embodiments, database 120 may be stored remotely from a computing device on which filtering is being performed.

First filtering level 122 may be any heuristic or algorithm for filtering email messages to catch spam. For example, first filtering level 122 may be a statistical model that strongly rejects spam, while second filtering level 124 may be a statistical model that is not as strong as first filtering level 122. In some embodiments, second filtering level 124 may be designed to have less false positives in detecting spam, but may not catch as much spam as first filtering level 122. First filtering level 122 may catch more spam than second filtering level 124, but may also cause more false positives than second filtering level 124. The term "spam" may refer to any unsolicited and/or unwanted electronic message.

In some embodiments, first time period 126 and second time period 128 may represent any time periods of a day. For example, first time period 126 may represent a time of day in which a user is at work and reading emails. Second time period 128 may represent a time of day in which the user is not at work and is not reading emails. In other embodiments, first time period 126 and second time period 128 may represent longer time periods. For example, second time period 126 may represent a time period covering Monday through Friday, and first time period 128 may be a time period covering Saturday and Sunday.

Modules 110 shown in system 100 may be stored on a user's computing device (e.g., a desktop computer, a laptop computer, a workstation, a handheld computing device, a mobile phone, etc.). Modules 110 may be part of a security software program that filters emails before they reach a user's local inbox. Modules 110, including filter-control module 112 and spam filter module 114, may also be stored on a web server, such as a proxy server for filtering emails. In other embodiments, modules 110 may filter emails before they arrive in a web-based email inbox. In at least one embodiment, filter-control module 112 may be stored on a separate computing device than spam filter 114. For example, filter-control module 112 may be stored on a server and may control filtering levels for spam filter 114, which may be stored on a client device.

FIG. 2 shows a computer-implemented method for filtering electronic messages. A filter-control module, such as filter-control module 112, may identify a first time period during which a user accesses electronic messages less than during a second time period (step 210). As previously mentioned, the first time period may designate any time or period of a day. For example, the first time period may be from 5:00 a.m. to 9:00 p.m. (e.g., for a user who does not typically access email during the day). The second time period may be from 9:00 p.m. to 5:00 a.m. (e.g., for a user who accesses email at night).

In some embodiments, the filter-control module may automatically identify the first and second time periods. For example, the filter-control module may monitor a user's access to electronic messages. Monitoring a user's access to electronic messages may include tracking electronic reading patterns of a user. In one example, the filter-control module may detect that the user reads all of the emails that they received overnight when they first come into work in the morning at 8:00 a.m. The filter-control module may also detect that the user reads emails as they come in throughout the day until 6:00 p.m. The filter-control module may determine that the user seldom accesses emails between 6:00 p.m. and 8:00 a.m.

The filter-control module may also automatically identify the first and second time periods by determining when a user is using a computing device on which spam filtering is to be performed. For example, if the computing device is a mobile computing device, the filter-control module may determine that the user uses the mobile computing device for various functions through the day, from 7:00 a.m. until 9:00 p.m. In other words, the filter-control module may monitor activities on a computing device other than, and/or in addition to, monitoring access to electronic messages. The first and second time periods may be set based on the monitoring of these activities.

The filter-control module may associate a first filtering level with the first time period (step 220). For example, the filter-control module may set the first filtering level for the first time period by associating the first filtering level with the first time period in a database, such as database 120. The filter-control module may also associate a second filtering level with the second time period (step 230). The filter-control module may set the second filtering level for the second time period by associating the second filtering level with the second time period in the database.

During the first time period, the filter-control module may set a spam filter to the first filtering level (step 240). The spam filter may be any suitable type of spam filter, and the first filter level may be any suitable heuristic, algorithm, or weighting used by the spam fitter to filter electronic messages. The spam filter may automatically process incoming electronic messages. The spam filter may filter electronic messages by organizing incoming electronic messages according a predefined criteria at least partially defined in the first filtering level. For example, the spam filter may pass an electronic message through for delivery to a user's mailbox, but if the message is identified as spam, the spam filter may send the message to a junk folder or may delete the message.

The first filtering level may cause the spam filter to perform stronger filtering than the second filtering level. Performing stronger filtering may refer to any filtering that is designed to catch more spam than comparatively weaker filtering. In some embodiments, stronger filtering may provide more false positives. Thus, stronger filtering may be used during a time period in which a user does not expect false positives to be as problematic as during other time periods.

For example, a user may not expect to receive many important emails from the hours of 12:00 a.m. to 6:00 a.m. Thus, the user may want stronger email filtering during this time period. The user may only expect emails from family and friends between 12:00 a.m. and 6:00 a.m. Thus, the user may use a filter level that rejects all emails other than emails from family and friends identified on a white-list (i.e., the filter may operate in white-list mode). The filter-control module may, during the second time period, set the spam filter to the second filtering level (step 250).

FIG. 3 is another flow diagram showing an example of filtering electronic messages. As shown, a filter-control module may monitor a user's access to electronic messages (step 310). The filter-control module may perform the monitoring by tracking times at which the user first reads unread electronic messages. In other embodiments, the filter-control module may track each time a user views an electronic message whether or not the message has already been viewed. In some embodiments, the filter-control module may track times at which the user creates and/or sends electronic messages. As part of the tracking, the filter-control module may save the collected data in a database.

The filter-control module may identify a first time period during which the user accesses electronic messages less than during a second time period (step 320). For example, the filter-control module may perform a statistical analysis of the data collected during the tracking to determine what time period (or time periods) during a day or week the user does or does not typically access email.

Based on the analysis of the collected data, the filter-control module may select filtering levels for different time periods. For example, the filter-control module may associate a first filtering level with the first time period (step 330). The filter-control module may also associate a second filtering level with the second time period (step 340). To associate a filtering level with a time period, the filter-control module may store the filtering level and time period identification information in a database and create associations between the filtering level and time period identification information.

During the first time period, the filter-control module may set a spam filter to the first filtering level (step 350). As part of setting a spam filter to the first filtering level, the filter-control module may access the database where filter level and time period information is stored. When the time arrives for using the first filter level, the filter-control module may use the information stored in the database to change one or more settings of the spam filter. In some embodiments, the filter-control module may change a weighting used by the spam filter.

In addition to or instead of changing a weighting used by the spam filter, the filter-control module may change a filtering heuristic or algorithm used by the spam filter. For example, one filtering level may cause the spam filter to only look at email sender information in an email header. If the sender is not identified on a white list, the spam filter may reject the email, delete the email, or otherwise treat the email differently than emails from senders identified on the white list. A different filtering level may cause the spam filter to search for certain text throughout the email. Any other filtering techniques, weightings, algorithms, and/or heuristics known by those of skill in the art may used in embodiments of the instant disclosure.

As previously mentioned, the first filtering level may cause the spam filter to perform stronger filtering than the second filtering level. During the second time-period, weaker filtering may be desirable and the filter-control module may set the spam filter to the second filtering level (step 360). During the first time period, the spam filter may filter electronic messages using the first filtering level (step 370). During the second time period, the spam filter may filter electronic messages using the second filtering level (step 380).

FIG. 4 shows a timeline 400 for using different filtering levels at different times of day. A filter-control module may collect the email access information show by the graph in FIG. 4. In some embodiments, the email access data may be data collected and averaged over two or more days, weeks, or months. As shown, a user may typically access thirty emails between 8:00 a.m. and 12:00 p.m., only ten emails between 12:00 p.m. and 4:00 p.m., and twenty emails between 4:00 p.m. and 5:00 p.m. FIG. 4 also shows that the user typically does not access emails between 5:00 p.m. and 8:00 a.m. Based on this email-access pattern, a filter-control module may use a second filtering level 412 from 8:00 a.m. to 5:00 p.m. and a first filtering level 414 from 5:00 p.m. to 8:00 a.m. The first filtering level 414 may provide stronger spam filtering relative to the second filtering level 412 and may reduce the amount of spam the user receives between 5:00 p.m. and 8:00 a.m.

While FIG. 4 only shows two different filtering periods with two different filtering levels, in some embodiments two or more different filtering levels may be used for two or more different time periods. For example, a filter-control module may set a first filtering level for a first time period, a second filtering level for a second time period, and a third filtering level for a third time period. The third time period may be a time period during which a user accesses electronic messages more than during the first time period and less than during the second time period. For example, if the user accesses email messages on a mobile telephone, the user may access the highest number of emails from 9:00 a.m. until 6:00 p.m., but the user may still access some emails between 6:00 p.m. and 9:00 p.m. The strongest filtering may be used from 9:00 p.m. until 9:00 a.m., weaker filtering may be used from 6:00 p.m. until 9:00 p.m., and the weakest filtering may be used from 9:00 a.m. until 6:00 p.m.

Also, while FIG. 4 shows the time periods to be time periods within a day, the time periods discussed herein may be any suitable periodic range of time. For example, in some embodiments, a time period may cover multiple days, one or more weeks, months, or even years (e.g., a filter-control module may implement stronger filtering on annual holidays).

The instant disclosure provides various advantages over prior solutions. For example, it may be less of a problem for a daytime email user to deal with an occasional piece of spam throughout the day once the user has done an initial morning clear of new messages. Since there are often items needing immediate attention in the morning set of messages, spam tends to be very disruptive at that time. Embodiments of the instant disclosure may reduce the amount of spam that users have to deal with when then have not been checking their electronic messages for a period of time.

Embodiments of the instant disclosure may also provide many other advantages. For example, some embodiments may make it more difficult for spammers to get spam through to day-time users during night-time hours (e.g., if a high number of users have stronger filtering during the night).

Thus, spammers may try to send more messages during the day. This may be good for at least three reasons. First, spammers may have a smaller window of time during which they are trying to send messages. For high-volume spammers, this may mean sending more messages in a shorter time to maintain their current load (and thus their current revenue). Sending the same amount of data over a shorter period of time means paying for more bandwidth, which may increase spammers' costs.

Second, if network access is priced like other utilities (i.e., cell phones, electricity, etc.), bandwidth for peak times may cost more than bandwidth for off-peak times. As the cost of sending spam goes up, the economics of sending spam may result in a reduction of the amount of spam sent. Third, it may be much more complicated for a spammer to try to time the sending of spam to the time zone where the recipient lives to align sending with time periods of weaker filtering (and therefore greater probability that the spam reaches the end user). To be effective, a spammer would need more than just a massive list of email addresses.

Figure 5:
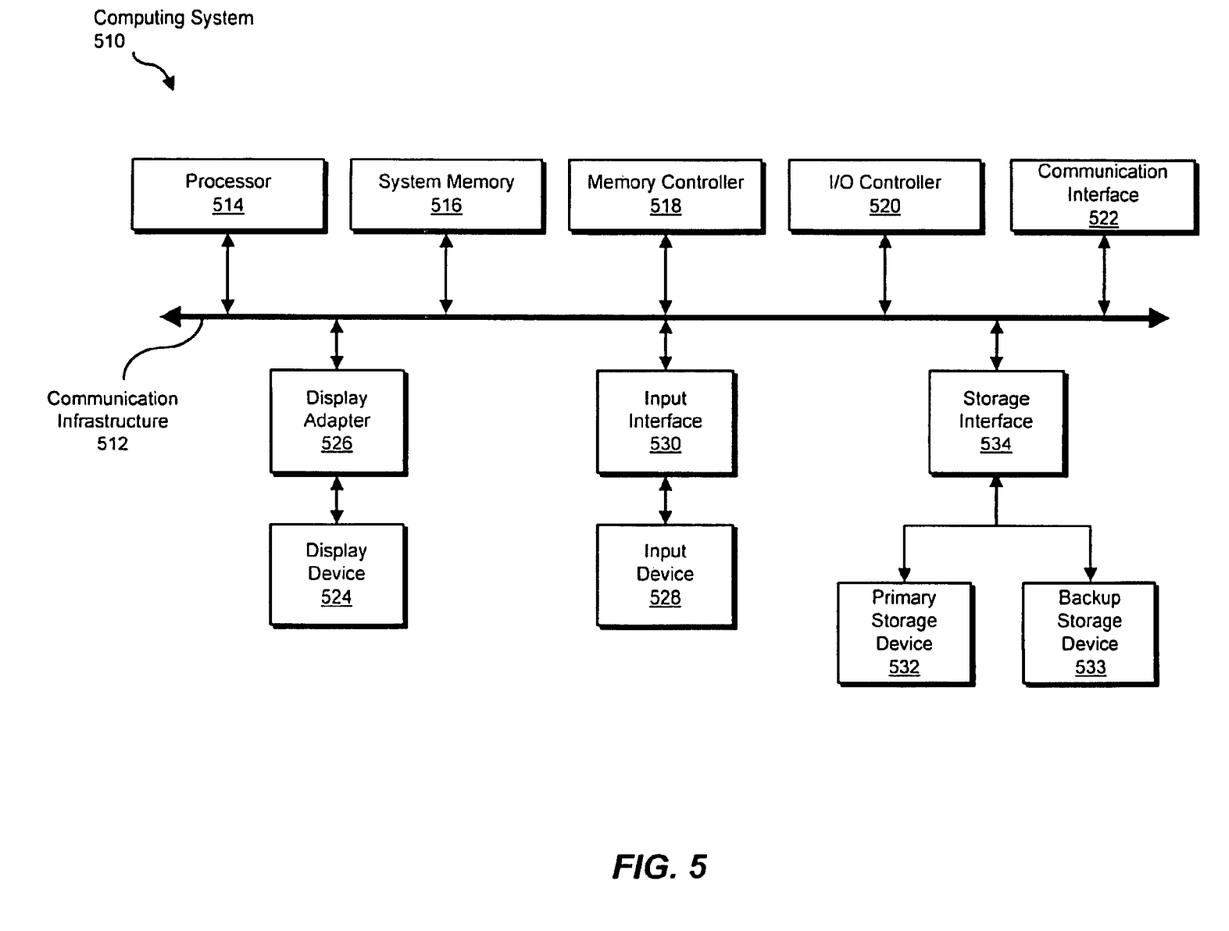
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may comprise at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, associating, setting, filtering, tracking, receiving, and/or determining steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may comprise both a volatile memory unit (such as, for example, system memory 516) and a non-volatile storage device (such as, for example, primary storage device 532, as described in detail below).

In certain embodiments, exemplary computing system 510 may also comprise one or more components or elements in addition to processor 514 and system memory 516. For example, as illustrated in FIG. 5, computing system 510 may comprise a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as identifying, associating, setting, filtering, tracking, receiving, and/or determining.

I/O controller 520 generally represents any type or form of module capable of coordinating and/or controlling the input and output functions of a computing device. For example, in certain embodiments I/O controller may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, associating, setting, filtering, tracking, receiving, and/or determining steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network comprising additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 594 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, associating, setting, filtering, tracking, receiving, and/or determining steps disclosed herein. Communication interface 522 may also be used to perform and/or be a means for performing other steps and features set forth in the instant disclosure.

As illustrated in FIG. 5, computing system 510 may also comprise at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also comprise at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, associating, setting, filtering, tracking, receiving, and/or determining steps disclosed herein. Input device 528 may also be used to perform and/or be a means for performing other steps and features set forth in the instant disclosure.

As illustrated in FIG. 5, exemplary computing system 510 may also comprise a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also comprise other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, the exemplary file systems disclosed herein may be stored on primary storage device 532, while the exemplary file-system backups disclosed herein may be stored on backup storage device 533. Storage devices 532 and 533 may also be used, for example, to perform and/or be a means for performing; either alone or in combination with other elements, one or more of the identifying, associating, setting, filtering, tracking, receiving, and/or determining steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
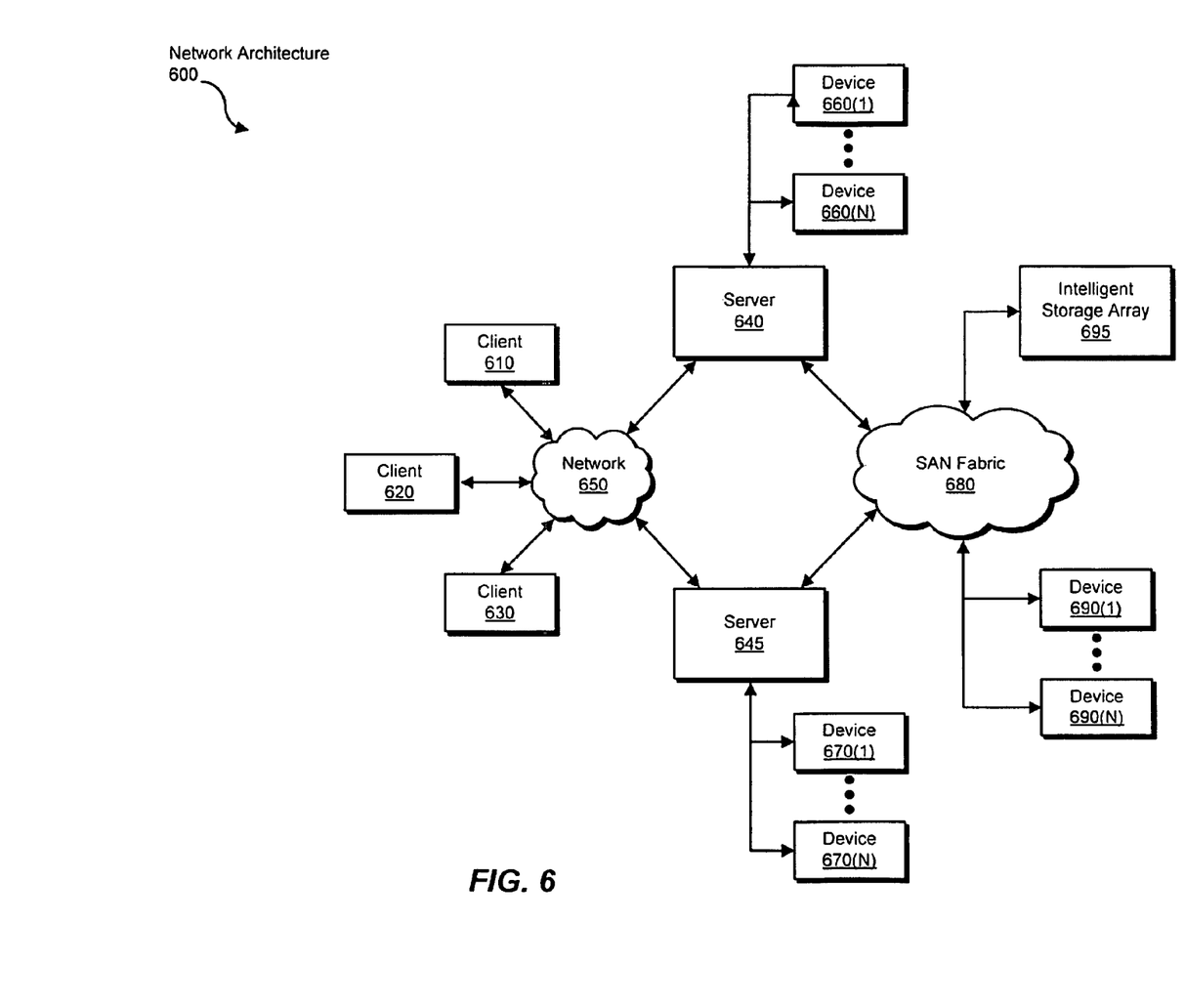
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. Similarly, servers 640 and 645 generally represent computing devices or system's, such as application servers or database servers, configured to provide various database services and/or to run certain software applications. Network 650 generally represents any telecommunication or computer network; including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, associating, setting, filtering, tracking, receiving, and/or determining steps disclosed herein. Network architecture 600 may also be used to perform and/or be a means for performing other steps and features set forth in the instant disclosure.

As detailed above, computing system 510 and/or one or more of the components of network architecture 600 may perform and/or be a means for performing, either alone or in combination with other elements, one or more steps of the exemplary methods described and/or illustrated herein. For example, a computer-implemented method for filtering electronic messages may be performed by computing system 510 and/or one or more of the components of network architecture 600. The computer-implemented method may comprise identifying a first time period during which a user accesses electronic messages less than during a second time period. The method may also comprise associating a First filtering level with the first time period, associating a second filtering level with the second time period, and, during the first time period, setting a spam filter to the first filtering level. The first filtering level may cause the spam filter to perform stronger filtering than the second filtering level. During the second time period, the spam filter may be set to the second filtering level. During the first time period, the spam filter may filter electronic messages using the first filtering level. During the second time period, the spam filter may filter electronic messages using the second filtering level.

In some embodiments, the computer-implemented method may comprise monitoring access to the user's electronic messages. In at least one embodiment, the computer-implemented method may comprise monitoring access to the user's electronic messages by tracing electronic message reading patterns of the user. In certain embodiments, identifying the first time period during which the user accesses electronic messages less than during a second time period may comprise receiving an identification of the first time period from a user. In some embodiments, the first time period may be during the night and the second time period may be during the day.

According to various embodiments, the user may access electronic messages through a first computing device. In such embodiments, identifying the first time period may comprise determining that the user uses the first computing device less during the first time period than during the second time period.

According to various embodiments, setting the spam filter to the first filtering level may comprise setting the spam filter to use a first filter weighting. Setting the spam filter to the second filtering level may comprise setting the spam filter to use a second filter weighting. The first filter weighting may cause the spam filter to filter more spam than the second filter weighting. In some embodiments, setting the spam filter to the first filtering level may comprise setting the spam filter to a white-list mode that causes the spam filter to filter messages from senders that are not identified on a white list.

In some embodiments, the method may comprise identifying a third time period during which a user accesses electronic messages more than during the first time period and less than during the second time period. The method may also comprise setting a third filtering level for the third time period. The method may further comprise, during the third time period, setting the spam filter to the third filtering level. The third filtering level may cause the spam filter to perform stronger filtering than the second filtering level and weaker spam filtering than the first filtering level. In some embodiments, the electronic messages may comprise email messages. In other embodiments, the electronic messages may comprise text messages.

In at least one embodiment, a system may comprise a filter-control module programmed to identify a first time period during which a user accesses electronic messages less than during a second time period. The system may also comprise a database that associates a first filtering level with the first time period. The database may also associate the second filtering level with the second time period. The system may further comprise a spam filter programmed to filter electronic messages using the first filtering level during the first time period. The spam filter may also be programmed to filter electronic messages using the second filtering level during the second time period.

In some embodiments, the filter-control module may be programmed to monitor access to the user's electronic messages. In at least one embodiment, the filter-control module may be programmed to trace electronic message reading patterns of the user. According to certain embodiments, the filter-control module may be programmed to receive an identification of the first time period from the user. In various embodiments, the filter-control module may be programmed to set the spam filter to the first filtering level during the first time period. The filter-control module may also be programmed to set the spam filter to the second filtering level during the second time period.

According to at least one embodiment, the first filtering level may comprise a first filter weighting and the second filtering level may comprise a second filter weighting. The first filter weighting may cause the filter to filter more spam than the second filter weighting. In some embodiments, the first filtering level may comprise a white-list mode that causes the spam filter to filter messages from senders that are not identified on a white list.

In some embodiments, a computer-readable media may comprise computer-executable instructions that, when executed by a computing device, cause the computing device to identify a first time period during which a user accesses electronic messages less than during a second time period. The computer-executable instructions may also cause the computing device to associate a first filtering level with the first time period and associate a second filtering level with the second time period. The computer-executable instructions may further cause the computing device to, during the first time period, set a spam filter to the first filtering level. The first filtering level may cause the spam filter to perform stronger filtering than the second filtering level. The computer-executable instructions may also, during the second time period, set the spam filter to the second filtering level.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for filtering electronic messages, the computer-implemented method comprising:
   identifying a first time period during which a user accesses electronic messages less than during a second time period;
   associating a first filtering level with the first time period;
   associating a second filtering level with the second time period;
   during the first time period, setting a spam filter to the first filtering level, the first filtering level causing the spam filter to perform stronger filtering than the second filtering level;
   during the second time period, setting the spam filter to the second filtering level.

2. The computer-implemented method of claim 1, further comprising:
   during the first time period, filtering electronic messages using the first filtering level;
   during the second time period, filtering electronic messages using the second filtering level.

3. The computer-implemented method of claim 1, wherein identifying the first time period during which the user accesses electronic messages less than during the second time period comprises:
   monitoring access to the user's electronic messages.

4. The computer-implemented method of claim 3, wherein monitoring access to the user's electronic messages comprises:
   tracking electronic message reading patterns of the user.

5. The computer-implemented method of claim 1, wherein identifying the first time period during which the user accesses electronic messages less, than during a second time period comprises:
   receiving an identification of the first time period from the user.

6. The computer-implemented method of claim 1, wherein:
   the first time period is during the night;
   the second time period is during the day.

7. The computer-implemented method of claim 1, wherein:
   the user accesses the electronic messages through a first computing device;
   identifying the first time period comprises determining that the user uses the first computing device less during the first time period than during the second time period.

8. The computer-implemented method of claim 1, wherein:
   setting the spam filter to the first filtering level comprises setting the spam filter to use a first filter weighting;
   setting the spam filter the second filtering level comprises setting the spam filter to use a second filter weighting, the first filter weighting causing the spam filter to filter more spam than the second filter weighting.

9. The computer-implemented method of claim 1, wherein:
   setting the spam filter to the first filtering level comprises setting the spam filter to a white-list mode that causes the spam filter to filter messages from senders that are not identified on a white list.

10. The computer-implemented method of claim 1, further comprising:

identifying a third time period during which a user accesses electronic messages more than during the first time period and less than during the second time period;
associating a third filtering level with the third time period;
during the third time period, setting the spam filter to the third filtering level, the third filtering level causing the spam filter to perform stronger filtering than the second filtering level and weaker spam filtering than the first filtering level.

11. The computer-implemented method of claim 1, wherein the electronic messages comprise email messages.

12. The computer-implemented method of claim 1, wherein the electronic messages comprise text messages.

13. A system comprising:
a filter-control module programmed to identify a first time period during which a user accesses electronic messages less than during a second time period;
a database that:
associates a first filtering level with the first time period;
associates a second filtering level with the second time period;
a spam filter programmed to:
filter electronic messages using the first filtering level during the first time period, the first filtering level causing the spam filter to perform stronger filtering than the second filtering level;
filter electronic messages using the second filtering level during the second time period.

14. The system of claim 13, wherein:
the filter-control module is programmed to monitor access to the user's electronic messages.

15. The system of claim 14, wherein:
the filter-control module is programmed to trace electronic message reading patterns of the user.

16. The system of claim 13, wherein:
the filter-control module is programmed to receive an identification of the first time period from the user.

17. The computer-implemented method of claim 13, wherein:
the filter-control module is programmed to set the spam filter to the first filtering level during the first time period;
the filter-control module is programmed to set the spam filter to the second filtering level during the second time period.

18. The computer-implemented method of claim 17, wherein:
the first filtering level comprises a first filter weighting;
the second filtering level comprises a second filter weighting, the first filter weighting causing the spam filter to filter more spam than the second filter weighting.

19. The computer-implemented method of claim 17, wherein:
the first filtering level comprises a white-list mode that causes the spam filter to filter messages from senders that are not identified on a white list.

20. A computer-readable medium comprising computer-executable instructions that, when executed by a computing device, cause the computing device to:
identify a first time period during which a user accesses electronic messages less than during a second time period;
associate a first filtering level with the first time period;
associate a second filtering level with the second time period;
during the first time period, set a spam filter to the first filtering level, the first filtering level causing the spam filter to perform stronger filtering than the second filtering level;
during the second time period, set the spam filter to the second filtering level.

* * * * *